United States Patent [19]

Gray et al.

[11] Patent Number: 5,262,081
[45] Date of Patent: Nov. 16, 1993

[54] LIQUID CRYSTALLINE POLYESTERS FOR OPTICAL DATA STORAGE

[75] Inventors: George W. Gray; Andrew M. McRoberts, both of Cottingham; Raymond Denman, Sproatley; Richard M. Scrowston, Walkington, all of Great Britain; David Lacey, Hull, England

[73] Assignee: Akzo N.V., Netherlands

[21] Appl. No.: 657,022

[22] Filed: Feb. 19, 1991

[30] Foreign Application Priority Data

Mar. 1, 1990 [EP] European Pat. Off. ........ 90302182.2

[51] Int. Cl.$^5$ .................. C09K 19/52; C08G 63/00
[52] U.S. Cl. .................. 252/299.01; 428/1; 528/176; 528/191; 528/192; 528/194
[58] Field of Search .......... 252/299.01; 428/1; 528/176, 191, 192, 194

[56] References Cited

U.S. PATENT DOCUMENTS

| | | | |
|---|---|---|---|
| 4,762,901 | 8/1988 | Dhein et al. | 528/73 |
| 4,837,745 | 6/1989 | Eich et al. | 365/108 |
| 4,886,718 | 12/1989 | Eich et al. | 282/299.6 |
| 4,896,292 | 1/1990 | Eich et al. | 359/36 |
| 4,959,448 | 9/1990 | Wreesmann et al. | 528/192 |
| 5,024,784 | 6/1991 | Eich et al. | 252/299.01 |

FOREIGN PATENT DOCUMENTS

| | | |
|---|---|---|
| 172517 | 2/1986 | European Pat. Off. . |
| 258898 | 3/1988 | European Pat. Off. . |
| 274128 | 7/1988 | European Pat. Off. . |
| 297554 | 1/1989 | European Pat. Off. . |

OTHER PUBLICATIONS

*Textbook of Practical Organic Chemistry*, Vogel, A., 4th ed., Longman Ltd., 978, p. 754.

*Primary Examiner*—Robert L. Stoll
*Assistant Examiner*—Shean C. Wu
*Attorney, Agent, or Firm*—Ralph J. Mancini; Louis A. Morris

[57] ABSTRACT

The invention comprises liquid crystalline polyesters suited to be used as a medium for optical data storage, especially reversible (or erasable) optical data storage. The polyesters comprise the polycondensation product of an aliphatic dicarboxylic acid or a derivative thereof and propane diol which on its center carbon bears a mesogenic substituent comprising two rings, either alicyclic or aromatic. Preferably also the dicarboxylic acid or derivative thereof is mesogenically substituted. The invention further comprises a medium for optical data storage containing polyesters of the above type.

6 Claims, No Drawings

LIQUID CRYSTALLINE POLYESTERS FOR OPTICAL DATA STORAGE

BACKGROUND OF THE INVENTION

The invention relates in general to liquid crystalline polyesters comprising the polycondensation product of an aliphatic dicarboxylic acid or a derivative thereof and a mesogenically substituted diol. More particularly, the present invention relates to liquid crystalline polyesters suited to be used as a medium for optical data storage, especially reversible (or erasable) optical data storage A polyester of the type indicated above is known from European Patent Application 0,258,898, which discloses polyesters comprising repeating units of the following general formula:

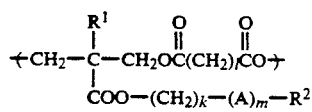

wherein:
R$^1$ is —H, —CH$_3$ or —C$_2$H$_5$,
l is an integer having a value of 1 to 20,
k is an integer having a value of 1 to 30,
A is —O—(oxygen) or —COO—,
m is 0 or 1,
and R$^2$ is

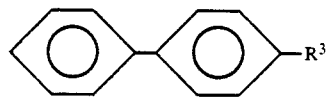

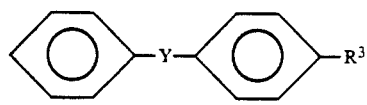

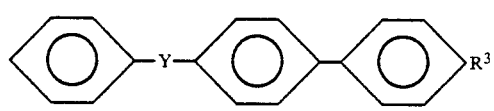

or

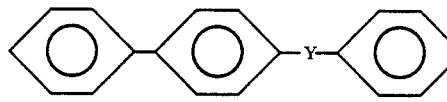

wherein Y is —COO— or —OCO—, and R$^3$ is COOR$^4$, —OCOR$^4$, —OR$^4$, —COR$^4$ or —R$^4$ where R$^4$ is

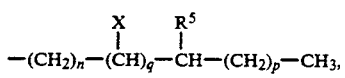

R$^5$ being —CH$_3$, —CN or a halogen radical, n and p being the same or different and representing an integer having a value of 0 to 10, with the proviso that if R$^5$ is —CH$_3$, p is not 0, X being a halogen radical, q being 0 or 1, and C being an asymmetric carbon atom.

The polyesters of EP 0,258,898 are used as display elements, more particularly for large screens and curved screens. With regard to possible use as a medium for optical data storage, however, the known polyesters display serious drawbacks, the most important of which is their low glass transition temperature.

For a material to be suitable as a medium for optical data storage its T$_g$ must be above room temperature. Information laser-written into a glassy polymeric material will not remain unimpaired at a temperature near T$_g$ on account of the too large rotational freedom of the polymer chains in the material The above polyesters display T$_g$ values varying from −30° C. to −9° C. and are thus rendered unsuitable for use in an optical data storage medium.

SUMMARY OF THE INVENTION

The invention provides liquid crystalline polyesters particularly suited to be used as a medium for optical data storage. The invention comprises a liquid crystalline polyester of the known type indicated above, the mesogenically substituted diol is of the formula

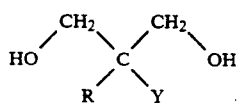

wherein R represents H or CH$_3$ and Y represents a mesogenic group of the formula

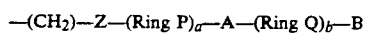

wherein
n is an integer having a value of from 2 to 12,
Z is CH$_2$ or an oxygen atom,
a+b is 2 to 4, with the proviso that both a and b are not equal to zero,
A is —CH$_2$—CH$_2$—, —CO$_2$—, —O$_2$C—, —CH$_2$O—, —OH$_2$C—, —CH$_2$—CH=CH—CH$_2$—, —CH=CH— or a single bond,
B is —NO$_2$, —CN, —OR, —R, —CF$_3$, wherein R is a linear alkyl or branched alkyl having up to 10 carbon atoms,
and the rings P and Q are chosen, independently, from the group consisting of:

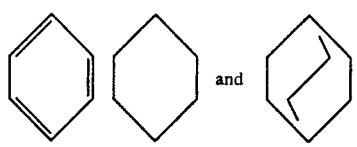

substituted or not with F, CH$_3$, CN or NO$_2$, with the proviso that the polyester has a T$_g$≧30° C. and a T$_c$≧60° C., with T$_g$<T$_c$.

DETAILED DESCRIPTION OF THE INVENTION

The term "mesogenic", which is known to the skilled man, is generally used to indicate chemical entities which are responsible for a compound being mesomorphic, i.e., exhibiting an anisotropic liquid crystal shape. T$_c$ (clearing temperature) is a concept frequently used to indicate the thermodynamic stability of a liquid crystalline phase and is known to the man skilled in the art. It marks the transition from an anisotropic to an isotropic liquid phase.

By way of further explanation it is remarked that it is desirable, though not essential, to have only a single liquid crystalline phase. In most cases this will be a nematic phase. $T_c$ then marks the transition from nematic to isotropic. If the only anisotropic phase is a smectic phase, $T_c$ marks the smectic to isotropic transition.

It is essential that there should not be any crystalline phases above the glass transition temperature, nor should the glass crystallize at an optical data storage device functioning temperature. For these reasons it is required that $T_g$ be lower than $T_c$ and higher than about 30° C.

It should be noted that the main difference between the polyesters according to the invention and those according to EP 0,258,898 is the absence of the ester function which links the prior art polyester backbones to the mesogenic groups. For the structurally closely related polyesters according to the invention to show a considerable improvement with respect to $T_g$ and $T_c$ is surprisingly unexpected. The improvement is essential to the extent that it marks the difference between materials that are unsuitable for actual practical use and those which can favorably be applied.

Materials with such high $T_g$ and $T_c$ have been disclosed in EP 172 517. This disclosure, however, pertains to polymers having mesogenic groups in the polymeric backbone. Such highly rigid backbones are generally known to display higher transition temperatures, whereas the invention pertains to aliphatic polyesters which have flexible backbones but still display favorable transition temperatures.

The aliphatic backbones according to the invention can be prepared by polycondensation of the above-discussed diol with an aliphatic dicarboxylic acid or derivative thereof. The term "derivative" is used to indicate those carboxylic compounds which are common in the art of preparing polyesters, including carboxylic acid chlorides, carboxylic esters and carboxylic anhydrides. Preferred are carboxylic acid chlorides and carboxylic esters of lower aliphatic ($C_1$-$C_6$) alcohols, with methanol, ethanol, propanol and butanol being most preferred. Aliphatic dicarboxylic acids include malonic acid, succinic acid, glutaric acid, pimelic acid, suberic acid, azelaic acid, sebacic acid, decane —1,10-dicarboxylic acid and dodecane —1,12 dicarboxylic acid.

Preferably the aliphatic dicarboxylic acid or derivative thereof is lower aliphatic, i.e. having a $C_1$-$C_6$ hydrocarbon chain. It is further preferred that the dicarboxylic acid moiety in the polyester backbone be mesogenically substituted in order to obtain a material having a high density of information spots. The mesogenic groups on the diol and on the dicarboxylic moiety may of course be the same or different. As a mesogenically substituted dicarboxylic moiety, malonic acid derivatives are preferred most.

The preferred embodiment of the present invention is a liquid crystalline polyester as described above, wherein all repeating units contain a 4-(4'-cyanobiphenyl) oxyhexylene mesogenic group.

The use of liquid crystalline polymers having pendant mesogenic groups for optical data storage is known generally in the art, e.g. from U.S. Pat. No. 4,896,292, incorporated herein by reference.

In general, the properties outlined above suffice to define polymers suitable for optical data storage. Preferred polyesters according to the invention are those particularly suited for use in reversible optical data storage. By reversible or erasable optical data storage is meant that information laser-written into a substrate can be stored under normal conditions but will be erased by heating, after which the substrate can be re-used for writing in fresh information. To be useful for reversible optical data storage not only must the polymer be liquid crystalline but also the side chains must exhibit positive dielectric anisotropy. This allows the polymer to be aligned using an electric field. Such mesogenic groups are of the D$\pi$A-type, i.e., comprising a delocated-electron system to which an electron-donor and an electron-acceptor are directly attached. In the formula previously given the rings P and Q therefore preferably are phenyl, Z preferably is oxygen, and B preferably —$NO_2$ or —CN.

As the artisan will understand, the invention also comprises mixtures of polyesters of the aforementioned types, as well as polyesters prepared from mixtures of diols and dicarboxylic acid derivatives. Also, the invention includes copolymers of polyesters according to the invention and other polymers which need not be mesogenically substituted. Low molar mass mesogens may be added to the polyesters according to the invention in order to tailor the properties of the polymer with regard to, e.g., the phases which are obtained, transition temperatures, viscosity, writing speed and processability.

The invention also relates to a medium for optical data storage comprising a liquid crystalline polyester as described hereinbefore. By medium for optical data storage is meant any device into which information can be laser-written. Such a device comprises a liquid crystalline polymer which, when viewed before writing, has either a scattering or a clear texture. When the polymer is addressed by a laser, the area addressed becomes contrasted, so that the polymer will then either be clear on scattering texture or have a scattering on clear texture.

Hereinafter the invention will be further explained in, but not limited by, the following Examples.

EXAMPLES

A. Preparation of Mesogenically Substituted diol
Preparation of diethyl 2-($\omega$-bromoalkyl) malonates Sodium (11.5 g, 0.5 moles) was added to dry ethanol (120 ml) and to the resulting solution at room temperature was added diethyl malonate (135 g, 0.88 moles); the resulting solution was stirred at room temperature for 30 mins. $\alpha$, $\omega$-Dibromoalkane (0.55 moles) in ether (150 ml) was added to the cold solution and the solution kept at $-5°$ C. for 24 hrs. The solution was then allowed to warm up to room temperature over 3 hrs., with stirring. The solution was then poured into water and the ether layer separated. The aqueous layer was then extracted with ether (2 times), and the combined extracts were washed with water, dried and evaporated. Distillation under reduced pressure afforded the diethyl 2-($\omega$-bromoalkyl) malonate. Yields ranged from 40–60% for alkyl chains where $\omega$ was 3–6.

Reduction of Diethyl 2-($\omega$-bromoalkyl) Malonates

Diisobutylaluminium hydride (285 ml, 1.5M in toluene) was added drop-wise, under nitrogen, to a stirred solution of diethyl 2-($\omega$-bromoalkyl) malonate (0.1 mole) in benzene (80 ml) and the resulting solution was allowed to stand overnight. The reaction mixture was decomposed by the addition of methanol (39.4 g, 1.2 moles) in benzene (75 ml), followed by water (2.3 g, 0.125 moles). The mixture was then filtered and the residue washed with methanol (4×100 ml). The filtrates were evaporated and distillation, under reduced pressure, of the residue afforded the 2-(ω-bromoalkyl) propane-1, 3-diol. Yields ranged from 50–80% for alkyl chains where ω was 3–6.

Diethyl 2-(ω-bromoalkyl) malonates and 2-(ω-bromoalkyl) propane-1, 3-diols were used to alkylate 4-substituted phenols using well established experimental procedures Reference: A. Vogel, Textbook of Practical Organic Chemistry, 4th Ed, Longman Ltd., London, 1978, pp. 754.

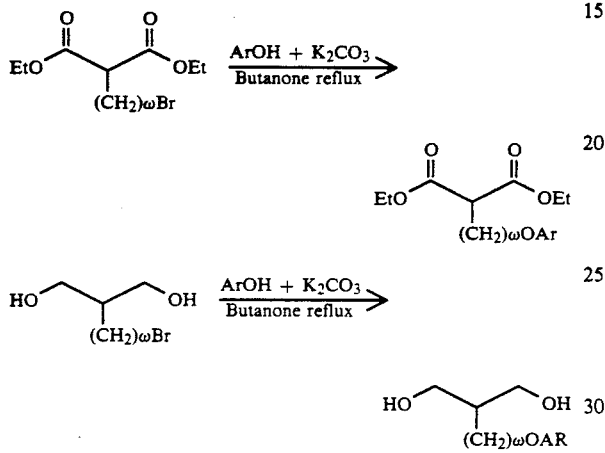

B. Typical Polymerization Procedure

Diethyl 2-{6[4-(4'-cyanobiphenyl)oxy]hexyl} malonate (0.875 g, 2 mmoles), 2-{6-[4-(4'-cyanobiphenyl)oxy]hexyl propane-1, 3-diol (0.707 g, 2 mmoles) and p-toluenesulphonic acid (0.01 g) were heated, with stirring at 170° C. under nitrogen for 2 hrs. Over the next two hrs. the temperature was raised to 190° C. and the pressure reduced to 12 torr. Finally the temperature was raised to 210° C. and the pressure reduced to 0.05 torr and the mixture was stirred under these conditions for a further 4 hrs. After this period the mixture was cooled, dissolved in a minimum volume of dichloromethane and the polymer precipitated with an excess of methanol; the polymer was then separated out using a centrifuge. This precipitation procedure was repeated (3 times), and the final polymer was heated at 100° C. in vacuo to remove volatile materials.

C. Specific Polymers

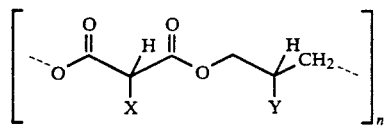

1.

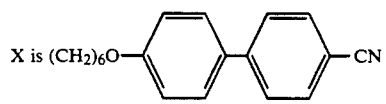

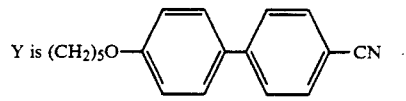

-continued

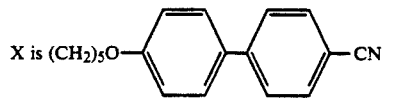 2.

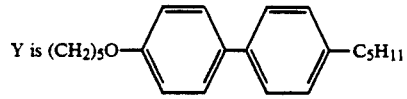

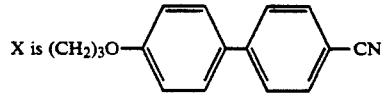 3.

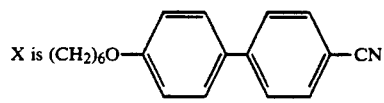 4.

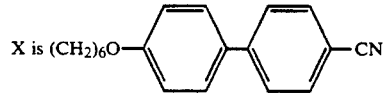 5.

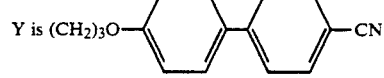

 6.

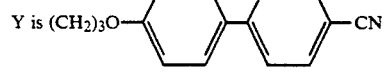

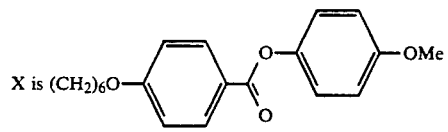 7.

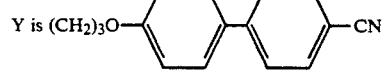

X and Y are, independently,

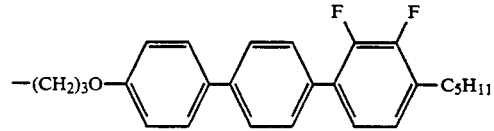 8.

Comparative 1

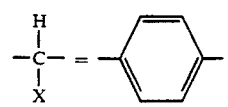

-continued

Y is (CH$_2$)$_6$O— 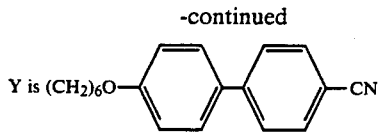 —CN

Comparative 2

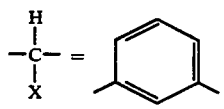

Y is (CH$_2$)$_6$O— 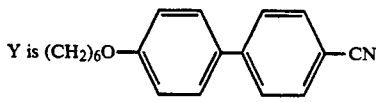 —CN

D. Results

TABLE

| Polymer | Mn | T$_g$ (°C.) | T$_c$ (°C.) |
|---|---|---|---|
| C1 | 4980 | 36.6 | 114.3 |
| C2 | 4260 | 53.7 | 127.3 |
| C3 | 4690 | 29.7 | 81.0 |
| C4 | 5230 | 43.2 | 112.4 |
| C5 | 5130 | 44.6 | 111.5 |
| C6 | 4720 | 55.3 | 107.0 |
| C7 | 4750 | 31.0 | 60.0 |
| C8 | 3870 | 55.0 | 310.0 |
| Comparative 1 | 4090 | 35.2 | 45.0 |
| Comparative 2 | 4010 | 22.9 | 44.5 |

We claim:

1. A liquid crystalline polyester comprising the polycondensation product of a mesogenically substituted aliphatic dicarboxylic acid or a derivative thereof and a mesogenically substituted diol of the formula

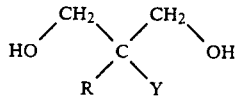

wherein R represents H or CH$_3$ and Y represents a mesogenic group of the formula —(CH$_2$)$_n$—Z—(Ring P)$_a$—A—(Ring Q)$_b$—B Wherein
n is 2 to 12,
Z is CH$_2$ or an oxygen atom,
a+b is 2 to 4, with the proviso that both a and b are not 0,

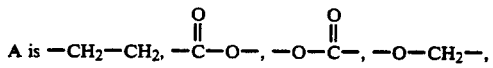
or a single bond

B is —NO$_2$, —CN, —OR, —R, or —CF$_3$, where R is a linear or branched alkyl group having up to 10 carbon atoms, and the Ring P and Ring Q are chosen, independently, from the group consisting of

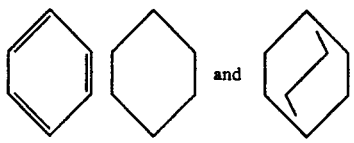

substituted or not with F, CH$_3$, CN or NO$_2$, with the proviso that the polyester has a T$_g \geq$ 30° C. and a T$_c \geq$ 60° C., with T$_g$<T$_c$.

2. The liquid crystalline polyester of claim 1 wherein the aliphatic dicarboxylic acid or derivative thereof is malonic acid or a malonic acid derivative.

3. The liquid crystalline polyester of claim 1 wherein the mesogenic group substituted on the aliphatic dicarboxylic acid or derivative thereof is a 4-(4'-cyanobiphenyl) oxyhexylene mesogenic group, substituted or not with F, CH$_3$, CN or NO$_2$.

4. The liquid crytalline polyester of claim 3 wherein the mesogenic group Y is a 4-(4'-cyanobiphenyl) oxyhexylene mesogenic group, substituted or not with F, CH$_3$, CN or NO$_2$.

5. The liquid crystalline polyester of claim 2 wherein the mesogenic group Y is a 4-(4'-cyanobiphenyl) oxyhexylene mesogenic group, substituted or not with F, CH$_3$, CN or NO$_2$.

6. A medium for optical data storage comprising a liquid crystalline polyester of claim 1.

* * * * *